United States Patent
Nedzlek

(10) Patent No.: US 8,506,210 B2
(45) Date of Patent: Aug. 13, 2013

(54) MATERIAL REMOVAL TOOL WITH ACTUATED GUIDE PADS

(75) Inventor: Kevin Nedzlek, Howell, MI (US)

(73) Assignee: Valenite LLC, Madison Heights, MI (US)

( * ) Notice: Subject to any disclaimer, the term of this patent is extended or adjusted under 35 U.S.C. 154(b) by 952 days.

(21) Appl. No.: 12/506,448

(22) Filed: Jul. 21, 2009

(65) Prior Publication Data

US 2010/0054879 A1   Mar. 4, 2010

Related U.S. Application Data

(60) Provisional application No. 61/093,481, filed on Sep. 2, 2008.

(51) Int. Cl.
*B23B 41/00* (2006.01)

(52) U.S. Cl.
USPC ................... 408/83; 408/57; 408/79

(58) Field of Classification Search
USPC ................... 408/1 R, 57, 59, 79–83
See application file for complete search history.

(56) References Cited

U.S. PATENT DOCUMENTS

| 3,287,998 | A |   | 11/1966 | Goernert et al. |  |
|---|---|---|---|---|---|
| 3,389,621 | A |   | 6/1968 | Wear |  |
| 4,053,249 | A | * | 10/1977 | Ness et al. | 408/1 BD |
| 5,062,187 | A | * | 11/1991 | Bromley | 29/33 T |
| 5,150,496 | A | * | 9/1992 | Bromley | 29/33 T |
| 5,865,573 | A |   | 2/1999 | Kress |  |
| 7,806,635 | B2 | * | 10/2010 | Weidmer | 408/1 R |
| 2001/0022920 | A1 |   | 9/2001 | Hyatt et al. |  |

FOREIGN PATENT DOCUMENTS

| JP | 10166219 A | * | 6/1998 |
|---|---|---|---|
| JP | 2002126946 A | * | 5/2002 |
| WO | WO 2005/009657 A2 |  | 2/2005 |
| WO | WO 2005/095034 A1 |  | 10/2005 |

OTHER PUBLICATIONS

Notification of the First Office Action for Chinese Patent Application No. 200980134400.9, dated Aug. 31, 2012.
Notification of the Second Office Action (with English translation) for Chinese Application No. 200980134400.9, dated Mar. 29, 2013.

* cited by examiner

*Primary Examiner* — David Bryant
*Assistant Examiner* — Jason L Vaughan
(74) *Attorney, Agent, or Firm* — Morgan, Lewis & Bockius LLP

(57) ABSTRACT

A material removal tool including a housing body having an active portion, at least one seating surface for a cutting insert operatively positioned on the active portion, and a guide pad positioned in a cavity in a circumferential surface of the active portion is disclosed. The guide pad is radially adjustable between a first radial position and a second radial position by a differential pressure across the guide pad. The differential pressure is created by an actuation fluid supplied to one side of the guide pad. A method for removing material from a workpiece with the rotating material removal tool is also disclosed.

16 Claims, 4 Drawing Sheets

MATERIAL REMOVAL TOOL WITH ACTUATED GUIDE PADS

RELATED APPLICATION DATA

This application claims priority under 35 U.S.C. §119(e) to U.S. Provisional Application No. 61/093,481, filed Sep. 2, 2008, the entire contents of which are incorporated herein by reference.

FIELD

The present disclosure relates to a material removal tool. More particularly, the present disclosure relates to a material removal tool with guide pads that can be radially translated by an actuation fluid.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Material removal tools with cutting locations positioned at a long projection distance from a spindle face can experience bending moments caused by cutting forces. Uncorrected bending moments can result in machining errors and other out-of-tolerance effects. Conventional methods to address bending moments in these tools have included fixing a ground wear strip to an end of the tool and to insert the end of the tool in a mating hole, thus providing support for the tool at both ends of the axis of the tool. Such wear strips require very tight tolerances to adequately position and support the end of the tool in the mating hole. For example, a ground bushing is generally required to accept the ground pads. Also, such mating holes must be already cut for the wear pads to work requiring a cutting edge to precede the wear pads.

SUMMARY

The presently disclosed material removal tool has radially adjustable guide pads. The radially adjustable guide pads can be repositioned, in-operation, to stabilize and/or centralize the material cutting tool, requiring lower tolerances while supporting the end of the tool in the mating hole. This design is applicable to any material removal tool with a long overhang from the spindle face and is particularly applicable to line boring and thrust wall tools on cylinder blocks when using CNC machining centers.

An exemplary material removal tool comprises a housing body including an active portion, at least one seating surface for a cutting insert operatively positioned on the active portion, and a guide pad positioned in a cavity in a circumferential surface of the active portion, wherein the guide pad is radially adjustable between a first radial position and a second radial position by a differential pressure across the guide pad.

An exemplary method for removing material from a workpiece with a rotating material removal tool comprises positioning a distal end of an active portion of the material removal tool in a mating hole in the workpiece to locate at least a portion of a guide pad in opposing relationship to a surface of the mating hole, wherein the guide pad is positioned in a cavity in a circumferential surface of the active portion, and developing a differential pressure across the guide pad to translate the guide pad radially outward.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
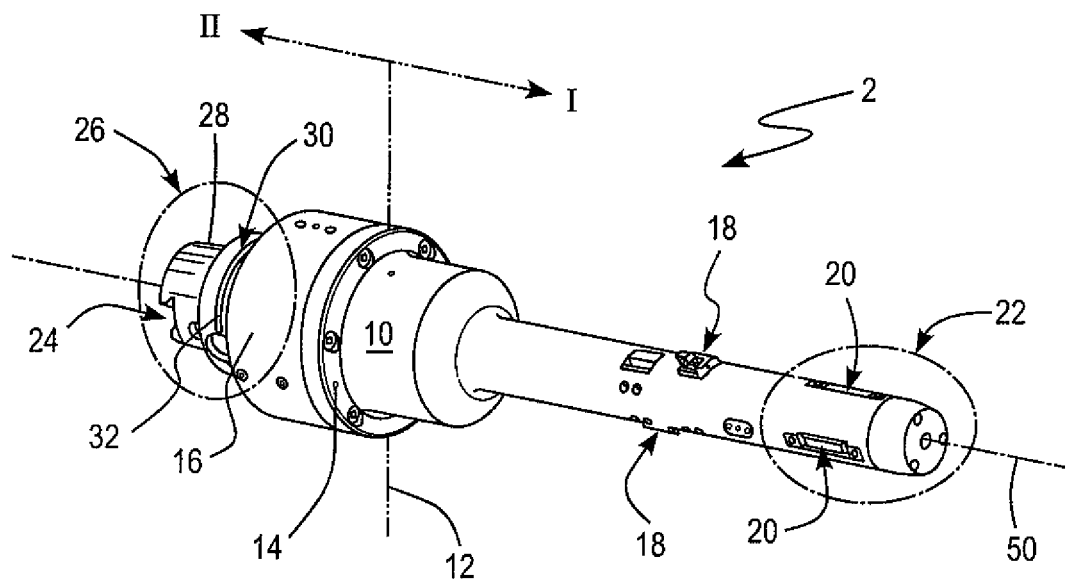
FIG. 1 is perspective view of an exemplary embodiment of a material removal tool.

FIG. 1 is perspective view of an exemplary embodiment of a material removal tool 2. The material removal tool can be generally described as having a housing with an active portion and a mounting portion. Referring to the exemplary embodiment of FIG. 1, the housing 10 includes an active portion I separated from the mounting portion II at a transition line 12. The transition line 12 can be coincident with the transition piece 14 or can be at a different location of the material removal tool 2, although generally in the area of the actuation chamber housing 16. During cutting operations, the active portion I is placed near or, for example during boring, inserted into the volume of the workpiece. The mounting portion II is generally not operatively positioned within the volume of the workpiece. Thus, only locations and features on the active portion I are available for material removal operations.

In the exemplary embodiment of FIG. 1, the active portion I generally has a regular shape, e.g., cylindrical, and has a different diameter than that of the mounting portion II. For an active portion I that has a regular shape, such as a cylinder, the diameter at any point of the active portion I is substantially constant along its axial length and an active volume of the material removal tool 2 can be defined as the volume occupied by the rotating material removal tool based on that diameter of the active portion I. For irregularly shaped active portions, an active volume can be defined as the volume occupied by the rotating material removal tool based on the largest diameter at any point of the active portion. When the active portion of the material removal tool has cutting inserts or other features that are the radially outermost surface along the active portion, then the diameter at the outermost surface of the cutting inserts or other feature is used to determine the active volume.

Some of the features associated with the active portion I are visible In FIG. 1. For example, the general relationship and the general location of the cutting features 18 and the guide pads 20 are shown. The cutting features 18 include at least one seating surface for a cutting insert operatively positioned on the active portion to allow the material removal tool 2 to perform cutting operations. The guide pads 20 are located proximate a first end 22 of the active portion I. When mounted on a machine tool, the first end 22 is a distal end relative to the machine tool. Other features include various openings, connectors and manipulators for assembly and operation of the material removal tool 2, as are known in the art.

Some of the features associated with the mounting portion II are also visible In FIG. 1. For example, the mounting portion II includes a connector 24 at a second end 26, which is a mating end for attachment to the machine tool. The connector 24 attaches to a machine tool, such as a MAG XS211 milling machine available from MAG Industrial Automation Systems, for operation. The connector 24 can take any suitable form that allows attachment to a desired machine tool, e.g., attachment to a spindle of the machine tool. In an exemplary embodiment, the connector 24 has a tapered surface 28, for example, tapered rearward or toward the second end 26. A transition piece 30 can optionally be included with the connector 24. An example of a transition piece 30 includes at least one feature for mating to an operating machine or to a storage system. For example, the transition piece 30 can include a circumferential groove 32. The circumferential groove 32, or similar structure, can provide an attachment point for mating the material removal tool 2 to a carousel storage system used in machining operations to store multiple material removal tools. In another example, the transition piece 30 can include a key slot or similar structure, which can provide an orientation or a mating with a corresponding feature on the machine tool when the material removal tool 2 is mounted for use.

Figure 2:
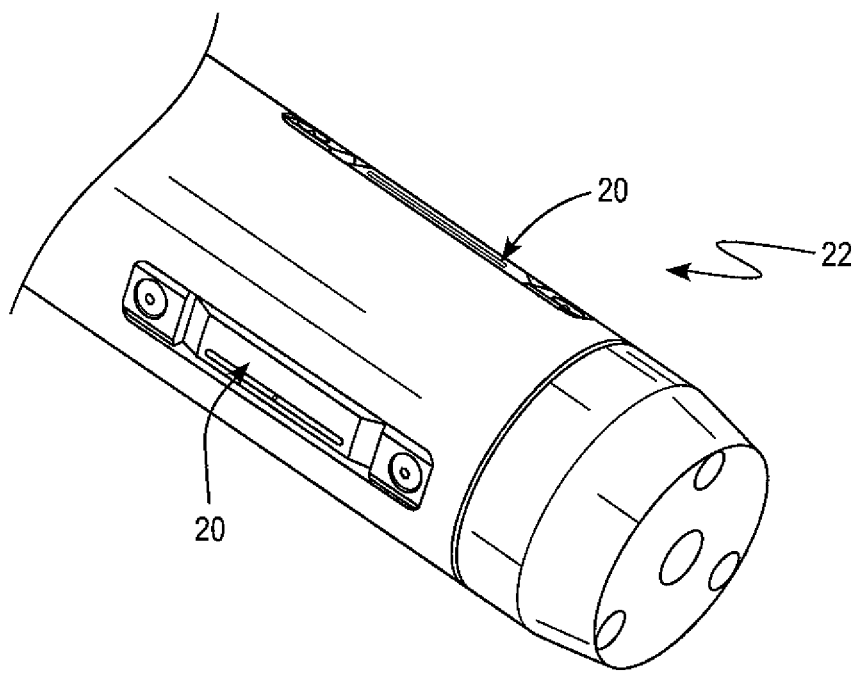
FIG. 2 is a magnified view of an active portion of the material removal showing the guide pads located proximate a first end thereof.
Figure 3:
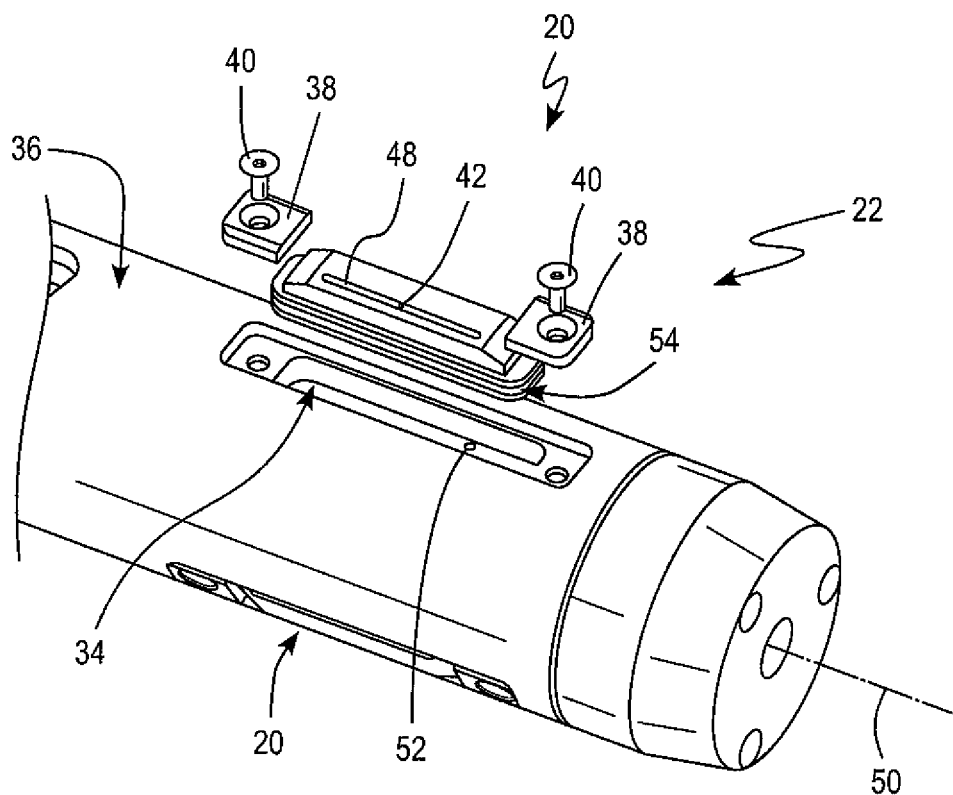
FIG. 3 is a partially disassembled view of some of the components located proximate the first end of the active portion of the material removal.

A magnified view of the first end 22 of the active portion I of the material removal tool 2 is shown in FIG. 2 and a partially disassembled view of some of the components located proximate the first end 22 of the active portion I of the material removal 2 is shown in FIG. 3. The plurality of guide pads 20 are positioned in a cavity 34 in a circumferential surface 36 of the active portion I of the material removal tool 2. One or more stops 38 hold the guide pad 20 in the cavity 34. The stop 38 can be mounted by a fastener, such as the threaded screw 40 shown. In some embodiments, the stop 38 allows the guide pad 20 to move radially within the cavity 34 but also limits the movement of the guide pad 20 in the radially outward direction. Also in some embodiments, the guide pad 20 translates radially outward to contact the surface of a mating hole, as described further herein. The cavity 34 can be of a single depth or can have more than one depth, as shown in FIG. 3, as necessary to accommodate the geometry of the guide pad 20 and associated features, such as the stops 38.

The guide pad 20 includes a channel 42 extending from a first side 44 of the guide pad 20 to a second side 46 of the guide pad 20. When assembled, the channel 42 on the first side 44 opens into the portion of the cavity 34 below the guide pad 20 and the channel 46 on the second side 46 opens into a groove 48 on the surface of the second side 46. The groove 48 assists in distributing lubricant fluid exiting the channel 42 on the second side 46, as described further herein. When the guide pad 20 is positioned in the cavity 34, the second side 46 of the guide pad 20 is the radially outward surface of the guide pad 20.

The guide pad 20 is radially adjustable between a first radial position and a second radial position. For example, a first radial position of the guide pad 20 can be a retracted position. In the retracted position, a radially outermost surface of the second side 46 of the guide pad 20 is at a first radial distance from an axis 50 of the material removal tool 2 where the first radial distance is less than a radial distance from the axis 50 of the outer circumferential surface 36 of the active portion I. Also for example, a second radial position of the guide pad 20 can be an extended position. In the extended position, a radially outermost surface of the second side 46 of the guide pad 20 is at a second radial distance from the axis 50 of the material removal tool 2 where the second radial distance is greater than a radial distance of the outer circumferential surface of the active portion. In some embodiments, the extended position contacts the second side 46 of the guide pad 20 with the surface of a mating hole, as described further herein.

The guide pad 20 is radially adjustable between the first radial position and the second radial position by a differential pressure ($\Delta P$) across the guide pad 20. An actuation fluid is supplied to the cavity 34 below the guide pad 20. For example, opening 52 in the wall of the cavity 34 can supply an actuation fluid from system of channels arranged internally within the material removal tool 2. The guide pad 20, in connection with an o-ring or other sealing member positioned in a circumferential groove 54 in the guide pad 20, substantially prevents leakage of the actuation fluid, which builds up a pressure and exerts a force on the first side 44 of the guide pad 20. This force is sufficient to radially adjust the position of the guide pad 20 in the cavity 34.

The differential pressure can be controlled or adjusted by any suitable means. For example, the channel 42 can vent the actuation fluid from the first side 44 to the second side 46. Accordingly, a shape and/or size of the channel 42 can control a value of the differential pressure. Also for example, the relative shapes and/or sizes of the radial cross-section of the opening 52 supplying the actuation fluid and the radial cross-section of the channel 42 in the guide pad 20 can be changed, i.e., the radial cross-section of the opening 52 can be greater than the radial cross-section of the channel 42. In addition, a surface area of the first side 44 of the guide pad 20 can influence the value of the differential pressure, with a smaller surface area increasing the differential pressure and vice versa.

As previously noted, the channel 42 can vent the actuation fluid from the first side 44 of the guide pad 20 to the second side 46 of the guide pad 20. In some embodiments, the channel 42 opens into a groove 48 on the second side of the guide pad 20. The groove 48 distributes the actuation fluid along the length of the guide pad 20 and, when the guide pad 20 rotates in unison with the material removal tool 2 during cutting operations, the distributed actuation fluid further distributes across the surface of the second side 46 of the guide pad 20. In this manner, the actuation fluid, which can be a lubricant, can provide cooling and lubrication to the guide pads, the first end of the material removal tool, the mating hole in which the first end is positioned and any interfaces therebetween. In the illustrated embodiment, the groove 48 is located near the leading edge 56 of the guide pad 20. The leading edge 56 is that edge of the guide pad 20 that, when the guide pad 20 is positioned in the cavity 34 and the material removal tool 2 is rotated for cutting operations, is in a foremost position in the rotational direction.

Figure 4:
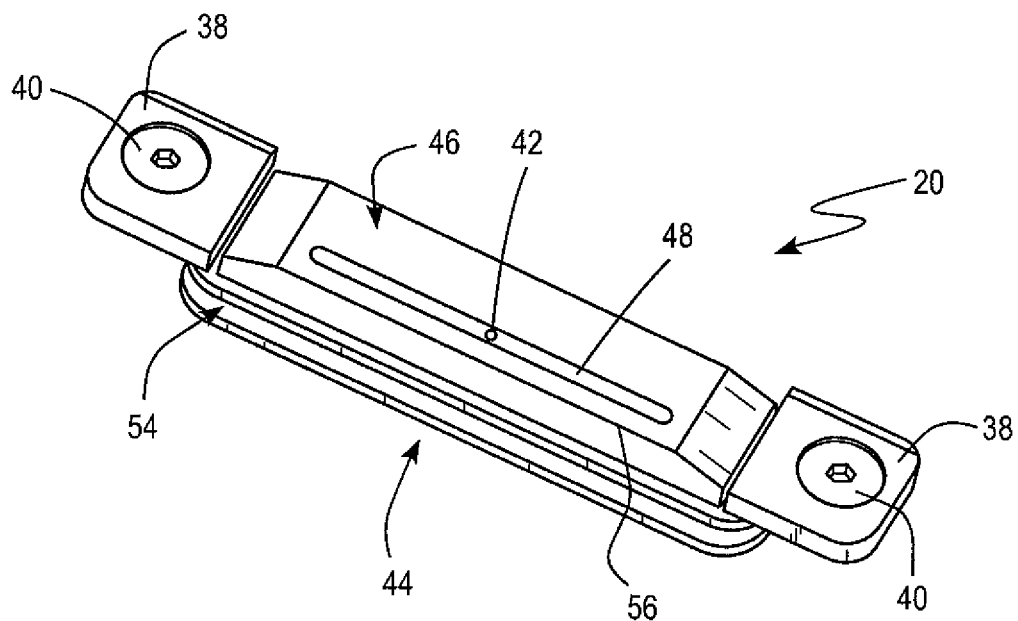
FIG. 4 is a first perspective view of an exemplary embodiment of a guide pad.
Figure 5:
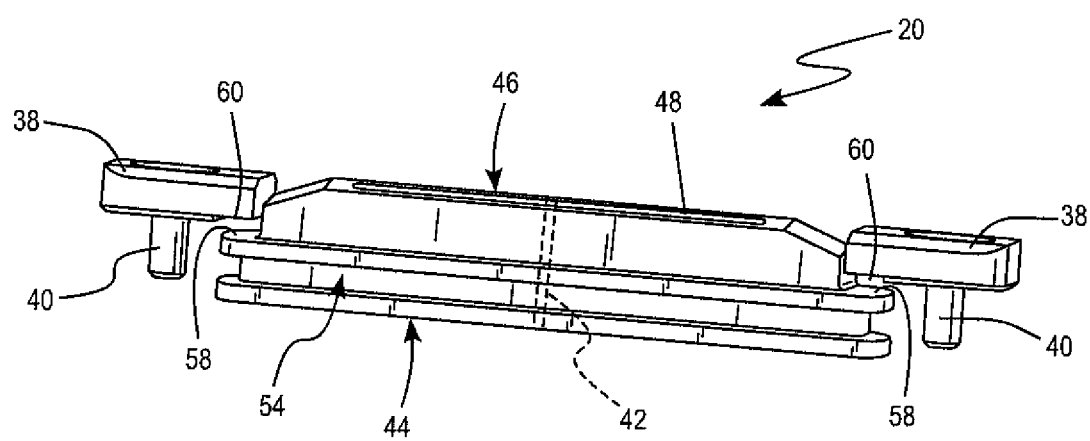
FIG. 5 is a second perspective view of an exemplary embodiment of a guide pad.

FIG. 4 is a first perspective view of an exemplary embodiment of a guide pad 20 and FIG. 5 is a second perspective view of an exemplary embodiment of a guide pad 20. In these perspective views, the relationship of the stops 38 to the guide pad 20 and the position of the circumferential groove 54 for the o-ring or other sealing member are more clearly shown. As seen in FIG. 5, the guide pad 20 has an extension 58 at each end which interacts with capture surfaces 60 on the stops 38 to restrain the guide pad's radial movement in the cavity 34.

Material removal tools as disclosed herein can be used for cutting operations. Relative to surfaces of a workpiece to be machined, the guide pads 20 precede cutting features 18. The actuating guide pads 20 can retract downward below the outer circumferential surface 36 of the material removal tool 2 to allow insertion into bores smaller than the finished part. Cutting elements on the cutting features 18 can then be extended by mechanical or other means for cutting operations, e.g., to finish the part. Because the actuating pads are at least partially inserted in a mating hole, the material removal tool is better supported and the effects of cutting forces are reduced, thus allowing for a straighter bore or face.

In an exemplary method for removing material from a workpiece with a rotating material removal tool, a distal end of an active portion of the material removal tool is positioned in a mating hole in the workpiece to locate at least a portion of a guide pad in opposing relationship to a surface of the mating hole. A differential pressure is then developed across the guide pad to translate the guide pad radially outward.

There are multiple optional positions for the guide pad during the exemplary method. In general, the guide pads 20 float in the cavity 34 but also form a seal (with sealing member 62, e.g., an o-ring) whereby a differential pressure can be made across the guide pad 20. The actuations fluid is supplied to the cavities 34 by conduits 64 internal to the material removal tool. The actuation fluid is vented through the channel 42, which has a smaller diameter than the opening 52, to establish and maintain the differential pressure. The relative sizes of channel 42 and the opening 52 can be varied to form a desired differential pressure, which translates the guide pad 20 in the radial direction. The guide pad 20 generally translates between an innermost position where the first side 44 is proximal the bottom surface 66 of the cavity 34 to an outermost position where the extensions 58 are restrained by capture surfaces 60 anchored by fastening mechanism or to an outermost position where the guide pad 20 translation is limited by the surface of the mating hole.

Figure 6A:
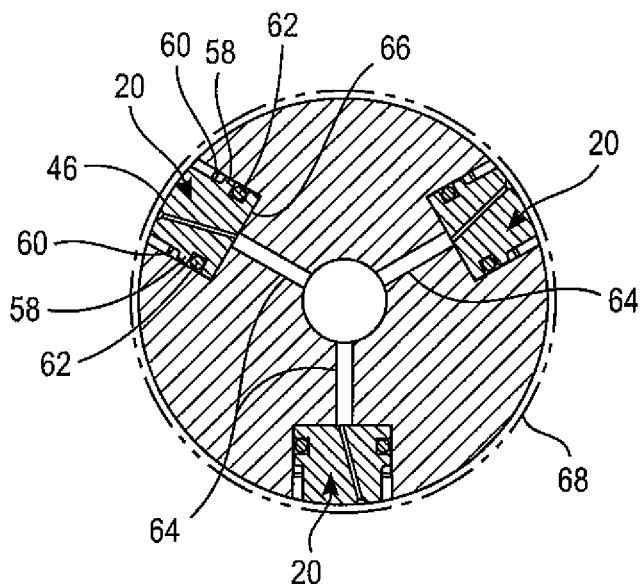
FIGS. 6A to 6C schematically illustrate cross-sections of a material removal tool in a mating hole showing the guide pads in different actuation positions.
Figure 6B:
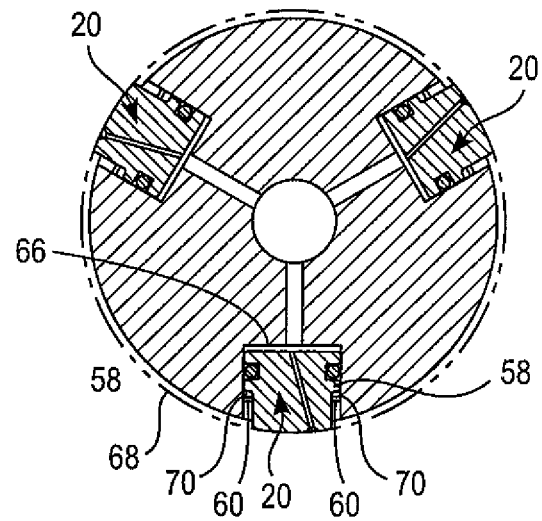
Figure 6C:
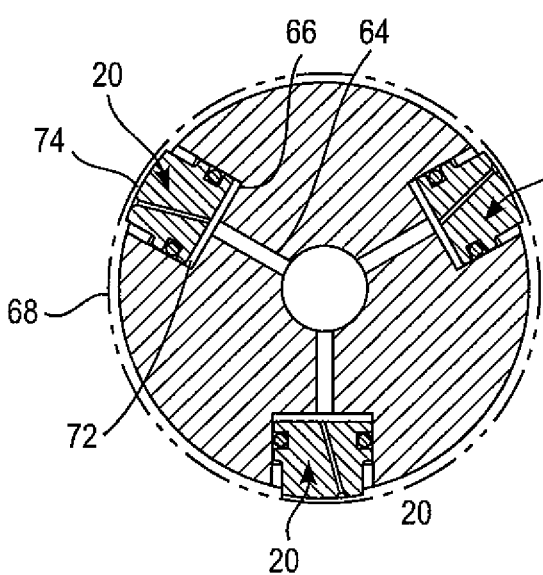

FIGS. 6A to 6C schematically illustrate cross-sections of a material removal tool in a mating hole showing the guide pads in different actuation positions. The guide pads can be actuated for radial adjustment collectively or individually depending on the control of the differential pressure to each. However, collective operation is considered more common.

FIG. 6A schematically illustrates the guide pads 20 in a retracted position. The guide pads 20 are in the cavity 34 with the second side 46 below the outer circumferential surface 36 of the active portion I. In the illustrated exemplary embodiment, the first side 44 of the guide pad 20 is in contact with a bottom surface 66 of the cavity 34.

FIG. 6B schematically illustrates the guide pads 20 adjusted to an extended position, where the guide pads 20 have been radial translated outward to contact the surface 68 of the mating hole. An actuation fluid has been supplied to the cavity 34 behind the first side 44 of the guide pad 20 and a differential pressure established across the guide pad 20. This differential pressure has translated the guide pad 20 radially outward. This outward radial translation is limited because the second side 46 of the guide pad 20 contacts the surface 68 of the mating hole. In this exemplary embodiment, the stops 38 are not contacted by the extensions 58 and there is a space 70 between the capture surfaces 60 and the extensions 58.

FIG. 6C schematically illustrates the guide pads 20 adjusted to an extended position, where the radial translation of the guide pads 20 is limited by the stops 38. There is both a volume 72 for the actuation fluid behind the first side 44 of the guide pad 20 and a space 74 between the second side 46 of the guide pad 20 and the surface 68 of the mating hole.

In exemplary embodiments, the differential pressure can be controlled to adjust the amount of friction between the guide pads and the surface of the mating hole. Too much friction inhibits rotation and can damages surfaces; too little friction produces inadequate support for the material removal tool.

In exemplary embodiments, the differential pressure can be controlled, e.g., by controlling the channel and/or opening geometry and size, amongst the several guide pads to be substantially (i.e., within ±10%) the same. Substantially (i.e., within ±10%) uniform differential pressure amongst the several guide pads contributes to centering the first end 22 of the material removal tool 2 in the mating hole.

To remove the material removal tool from the mating hole, the differential pressure across the guide pad is relieved to translate the guide pad radially inward. The distal end of the active portion of the material removal tool can then be withdrawn from the mating hole in the workpiece. Relieving the differential pressure can be a reduction from the differential pressure established to translate the guide pads radially outward, can be a venting of differential pressure toward zero, or can be a removal of differential pressure to zero. Translation in this instance is passive, in that the guide pads are free to translate radially inward, but are not forced to retract. Alternatively, a biasing element, such as an axial spring between the extensions 58 and capture surfaces 60, can force retraction of the guide pad. Inclusion of a biasing element can make the design more complicated.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
   a housing body including an active portion;
   at least one seating surface for a cutting insert operatively positioned on the active portion; and
   a guide pad positioned in a cavity in a circumferential surface of the active portion,
   wherein the guide pad is radially adjustable between a first radial position and a second radial position by a differential pressure across the guide pad,
   wherein the differential pressure is developed by an actuation fluid supplied to the cavity and vented from a first side of the guide pad to a second side of the guide pad through a channel in the guide pad, and
   wherein the channel opens into a groove on the second side of the guide pad to provide lubricant to the second side of the guide pad, the second side of the guide pad being a radially outward surface of the guide pad.

2. The material removal tool of claim 1, wherein an o-ring is positioned in a circumferential groove in the guide pad and substantially seals the guide pad in the cavity to develop the differential pressure.

3. The material removal tool of claim 1, wherein a size of the channel controls a value of the differential pressure.

4. The material removal tool of claim 1, wherein a radial cross-sectional size of an opening supplying the actuation fluid is greater than a radial cross-sectional size of the channel in the guide.

5. The material removal tool of claim 1, wherein a surface area of the first side of the guide pad controls a value of the differential pressure.

6. The material removal tool of claim 1, wherein, in the first radial position, a radially outermost surface of the second side of the guide pad is at a first radial distance from an axis of the material removal tool, the first radial distance less than a radial distance of an outer circumferential surface of the active portion from the axis of the material removal tool, and wherein, in the second radial position the radially outermost surface of the second side of the guide pad is at a second radial distance from the axis of the material removal tool, the second radial distance greater than the radial distance of the outer circumferential surface of the active portion from the axis of the material removal tool.

7. The material removal tool of claim 1, wherein, in the second radial position a radially outermost surface of the guide pad is at a radial distance from an axis of the material removal tool that is greater than a radial distance of an outer surface of the active portion from the axis of the material removal tool.

8. The material removal tool of claim 1, wherein movement of the guide pad in a radially outward direction is limited by one or more stops.

9. The material removal tool of claim 1, wherein the guide pad is located proximate a first end of the active portion, the first end distal from a connector of the material removal tool.

10. A method for removing material from a workpiece with a rotating material removal tool, the method comprising:
positioning a distal end of an active portion of the material removal tool in a mating hole in the workpiece to locate at least a portion of a guide pad in opposing relationship to a surface of the mating hole,
wherein the guide pad is positioned in a cavity in a circumferential surface of the active portion; and developing a differential pressure across the guide pad to translate the guide pad radially outward,
wherein the differential pressure across the guide pad is developed by supplying an actuation fluid to a first side of the guide pad and venting the supplied actuation fluid from the first side to a second side through a channel in the guide pad, and
wherein the actuation fluid is a lubricant and the vented actuation fluid supplies the lubricant to the second side of the guide pad.

11. The method of claim 10, wherein the guide pad is translated radially outward to contact the surface of the mating hole.

12. The method of claim 10, wherein a distance the guide pad is translated radially outward is limited by one or more stops.

13. The method of claim 10, comprising sizing the channel in the guide pad to obtain a desired value of the differential pressure.

14. The method of claim 10, wherein the second side is a radially outermost surface of the guide pad.

15. The method of claim 10, comprising positioning an o-ring in a circumferential groove in the guide pad to seal the guide pad in the cavity to develop the differential pressure.

16. The method of claim 10, comprising relieving a differential pressure across the guide pad to translate the guide pad radially inward and withdrawing the distal end of the active portion of the material removal tool from the mating hole in the workpiece.

* * * * *